(12) United States Patent
Jeong et al.

(10) Patent No.: US 11,641,918 B2
(45) Date of Patent: May 9, 2023

(54) CORDLESS HAIR DRYER

(71) Applicant: Foundation of Soongsil University-Industry Cooperation, Seoul (KR)

(72) Inventors: Young Jin Jeong, Seoul (KR); Jae Woo Chung, Seoul (KR); Hyeon Jun Song, Seoul (KR)

(73) Assignee: Foundation of Soongsil University-industry Cooperation, Seoul (KR)

( * ) Notice: Subject to any disclaimer, the term of this patent is extended or adjusted under 35 U.S.C. 154(b) by 150 days.

(21) Appl. No.: 17/272,683

(22) PCT Filed: Nov. 7, 2019

(86) PCT No.: PCT/KR2019/015028
§ 371 (c)(1),
(2) Date: Mar. 2, 2021

(87) PCT Pub. No.: WO2020/226245
PCT Pub. Date: Nov. 12, 2020

(65) Prior Publication Data
US 2021/0289907 A1     Sep. 23, 2021

(30) Foreign Application Priority Data
May 8, 2019  (KR) .................. 10-2019-0053706

(51) Int. Cl.
*A45D 20/12*   (2006.01)
(52) U.S. Cl.
CPC ........ *A45D 20/12* (2013.01); *A45D 2020/128* (2013.01); *A45D 2200/202* (2013.01); *A45D 2200/205* (2013.01)

(58) Field of Classification Search
CPC .............. A45D 20/12; A45D 2020/128; A45D 2200/202; A45D 2200/205
(Continued)

(56) References Cited

U.S. PATENT DOCUMENTS 3,786,575 A * 1/1974 Riblett .................... F21S 8/061
34/88
4,635,382 A * 1/1987 Bourdeau .............. A45D 20/06
34/493
(Continued)

FOREIGN PATENT DOCUMENTS

CN       113015459 A * 6/2021    ............. A45D 20/12
EP       2680666 B1 * 12/2017    ............. A45D 20/12
(Continued)

OTHER PUBLICATIONS

International Search Report and the Written Opinion dated Feb. 20, 2020 From the International Searching Authority Re. Application No. PCT/KR2019/015028 and Its Translation of Search Report Into English. 9 Pages.
(Continued)

*Primary Examiner* — Stephen M Gravini

(57) ABSTRACT

Provided is a cordless hair dryer. The cordless hair dryer includes a housing including a body part gripped by a user and a head part having a blower tube therein, a battery disposed inside the body part, a blower fan disposed in one end of the head part, a support which is inserted into the other end of the head part and fixed to an inner side of the blower tube, and a planar heating element which is formed as a carbon nanotube sheet and disposed on the support to receive power from the battery.

15 Claims, 10 Drawing Sheets

(58) Field of Classification Search
USPC .................................................... 34/95–100
See application file for complete search history.

(56) References Cited

U.S. PATENT DOCUMENTS

| | | | | |
|---|---|---|---|---|
| 5,195,253 | A * | 3/1993 | Poumey | A45D 20/04 |
| | | | | 392/382 |
| 5,507,103 | A * | 4/1996 | Merritt | F25B 21/02 |
| | | | | 62/3.4 |
| 5,839,204 | A * | 11/1998 | Cinque | A45D 20/10 |
| | | | | D28/16 |
| 5,857,262 | A * | 1/1999 | Bonnema | F24H 3/0488 |
| | | | | 431/344 |
| 7,260,900 | B2 * | 8/2007 | Anthes | A45D 20/06 |
| | | | | 431/153 |
| 7,380,347 | B2 * | 6/2008 | Coats | A45D 20/12 |
| | | | | 34/97 |
| 7,946,056 | B2 * | 5/2011 | Kroll | A45D 20/22 |
| | | | | 34/100 |
| 8,028,437 | B2 * | 10/2011 | Brown-Carter | A45D 20/12 |
| | | | | 34/100 |
| 9,474,347 | B2 * | 10/2016 | Pedroarena | A45D 1/04 |
| 9,526,311 | B1 | 12/2016 | Schaefer et al. | |
| 9,756,922 | B1 * | 9/2017 | Duthe | A45D 20/12 |
| 10,021,951 | B2 * | 7/2018 | Bobillier | A45D 20/12 |
| 10,021,952 | B2 * | 7/2018 | Goldman | F26B 21/10 |
| 11,013,376 | B2 * | 5/2021 | Yoo | A45D 20/12 |
| 11,388,973 | B2 * | 7/2022 | Lei | A45D 20/12 |
| 2007/0114219 | A1 | 5/2007 | Rizzuto, Jr. | |
| 2011/0036828 | A1 | 2/2011 | Feng et al. | |
| 2021/0289907 | A1 * | 9/2021 | Jeong | A45D 20/12 |

FOREIGN PATENT DOCUMENTS

| | | | | |
|---|---|---|---|---|
| EP | 3970556 A1 * | 3/2022 | | A45D 20/12 |
| JP | 47-015581 | 6/1972 | | |
| JP | 11-196927 | 7/1999 | | |
| JP | 2003-086334 | 3/2003 | | |
| JP | 2004-508120 | 3/2004 | | |
| JP | 2004-211239 | 7/2004 | | |
| JP | 2011-038238 | 2/2011 | | |
| JP | 2018-129270 | 8/2018 | | |
| JP | 2021532937 A * | 2/2021 | | |
| KR | 10-1028713 | 4/2011 | | |
| KR | 2011-0113121 | 10/2011 | | |
| KR | 2012-0051473 | 5/2012 | | |
| KR | 2012-0081798 | 7/2012 | | |
| KR | 10-2039504 | 10/2019 | | |
| WO | WO 2017/086395 | 5/2017 | | |
| WO | WO 2020/226245 | 11/2020 | | |
| WO | WO-2020226245 A1 * | 11/2020 | | A45D 20/12 |

OTHER PUBLICATIONS

Notice of Reasons of Rejection dated Mar. 22, 2022 From the Japan Patent Office Re. Application No. 2021-506490. (4 Pages).
Notice of Reason for Rejection dated Oct. 25, 2022 From the Japan Patent Office Re. Application No. 2021-506490. (4 Pages).

* cited by examiner (a)

(b)

(a)

(b)

(a)

(b)

CORDLESS HAIR DRYER

RELATED APPLICATIONS

This application is a National Phase of PCT Patent Application No. PCT/KR2019/015028 having International filing date of Nov. 7, 2019, which claims the benefit of priority of Korean Patent Application No. 10-2019-0053706 filed on May 8, 2019. The contents of the above applications are all incorporated by reference as if fully set forth herein in their entirety.

FIELD AND BACKGROUND OF THE INVENTION

Embodiments of the present invention relate to a cordless hair dryer.

In the conventional hair dryers, when a power plug is connected to a power socket and then a power switch is turned on, power is applied to heat wires, such as tungsten coils, iron chromium wires, or nichrome wires, wound in a plate or spring type so that the heat wires are heated, and at the same time, the power is also applied to a fan motor mounted on a rear end part of a main body so that a fan mounted on the fan motor is driven. When the fan is driven, air is suctioned into the main body through an inlet, the suctioned air is converted into hot air while passing through a heater, and the hot air is discharged to the outside through an outlet. Therefore, a user may dry hair or set a desired hair shape.

Such a hair drying method has a problem in that only an outer side of hair is heated, and thus an inner side of the hair that the hot air does not reach is not dried well. Further, when the hot air of the hair dryer is applied to one part of the hair for a long time in order to dry the inner side of the hair, there is a problem in that the hair is damaged due to the high temperature hot air. Further, since there is a problem in that efficiency of the heat wires which generate hot air is low such that a lot of electricity is consumed, it is difficult to implement a battery-powered cordless hair dryer.

Meanwhile, in the modern hair dryers, in addition to the original function of drying hair, various addition requirements are required. Such requirements include 1) promotion of hair health, 2) energy saving, and the like.

Light in a wavelength band of 3 µm to 1,000 µm is referred to as far-infrared rays (IR-C). Generally, it is known that the far-infrared rays have a thermal action, drying, biological effect, activation of water, promotion of ripening and growth, a penetrating action, a radiative action, and the like. Meanwhile, a human body is a kind of natural heat source with an average body temperature of 36.5° C., and 46% of total radiated energy radiated from the human body corresponds to far-infrared rays with a wavelength of 8 µm to 14 µm. Various attempts such as supplying anions, emitting far-infrared rays, and the like have been made to improve the health of the hair, and various devices are being used to emit anions or far-infrared rays. In PCT/JP2001/011284, a hair dryer in which anions are emitted is disclosed.

Meanwhile, as a related art using carbon as a heating element, a technique in which a tubular ceramic heater coated with a heating material and an electrode material is provided inside a main body of a hair dryer so that hair is protected by generating anions and far-infrared rays is disclosed in Korean Patent Publication No. 2007-0094041. In the above technique, the carbon is applied to the hair dryer by coating the ceramic heater with a heat generating source including carbon.

In addition, in Japanese Registered Utility Model No. 3011964, a hair dryer which is coated with a coating agent emitting far-infrared rays or in which a carbon molded body is mounted so that warm air accompanying far-infrared rays is discharged from a through-hole to the outside is disclosed. In the above technique, the carbon molded body is not used as a heat generating source, but the air heated by the heated heater passes through the carbon molded body, and thus a radiation quantity of far-infrared rays is reduced.

Further, in Korean Registered Utility Models No. 20-0369381 and 20-0364340, a hair dryer equipped with a carbon fiber heater to dry hair using both convection heating and infrared radiation heating is disclosed. In the above technique, a method in which carbon fiber is used and a quartz glass tube is sealed after vacuum treatment by putting the carbon fiber inside the quartz glass tube is used that is weak against impact.

In view of the flow of technique development, interest has been focused on techniques to supply sufficient far-infrared rays rather than corded hair dryers, and development of cordless hair dryers is required as battery techniques are developed.

The present invention is directed to providing a cordless hair dryer suitable for low-power driving due to low power consumption and high emissivity.

The present invention is also directed to providing an eco-friendly cordless hair dryer made of a carbon material and capable of low-power driving.

SUMMARY OF THE INVENTION

One aspect of the present invention provides a cordless hair dryer including a housing including a body part gripped by a user and a head part having a blower tube therein, a battery disposed inside the body part, a blower fan disposed in one end of the head part, a support which is inserted into the other end of the head part and fixed to an inner side of the blower tube, and a planar heating element which is formed as a carbon nanotube sheet and disposed on the support to receive power from the battery.

The planar heating element may be formed as a carbon nanotube sheet in the form of a sheet having continuity.

The support may be provided with a plurality of supports, and the planar heating element may include a plurality of carbon nanotube sheets, each of which is disposed on one of the supports.

The planar heating element may include the plurality of carbon nanotube sheets disposed on the support to be spaced a predetermined interval from each other.

The planar heating element may be disposed on the support in a spiral form.

The planar heating element may have an electrical conductivity of $10^4$ S/m or higher.

The body part may include an inlet which communicates with the outside and provides an air flow path.

The body part may include an inner layer, which surrounds the battery, and an outer layer which is spaced a predetermined interval from the inner layer and surrounds the inner layer.

The support may include a body part, around which the planar heating element is wound, and a support part which is in contact with the inner side of the blower tube and supports the body part.

The planar heating element may emit anions and light having near-infrared ray wavelengths, mid-infrared ray wavelengths, and far-infrared ray wavelengths.

The planar heating element is an aggregate of carbon nanotubes and may be formed of only carbon nanotubes without a binder and other inevitable impurities so that a temperature of the planar heating element rises to a range of 400° C. to 800° C. when power is supplied.

The planar heating element may surrounds a periphery of the body part, wherein an upper end part and a lower end part of the planar heating element which are opposite to each other on the body part are spaced a predetermined interval from each other, and a cathode electrode and an anode electrode are provided along edges of the upper end part and the lower end part so that the power may be supplied through the cathode electrode and the anode electrode.

The planar heating element may have a temperature of 800° C. when 70 W of power is supplied.

The cordless hair dryer according to the present invention can consume less power and have high emissivity, thereby being suitable for low-power driving.

Further, the cordless hair dryer can be suitable for cordless driving.

Further, the cordless hair dryer can emit far-infrared rays and anions.

Further, it is possible to provide an eco-friendly cordless hair dryer made of a carbon material and capable of low-power driving.

Further, the cordless hair dryer can have high heat resistance.

DESCRIPTION OF SPECIFIC EMBODIMENTS OF THE INVENTION

Figure 1:
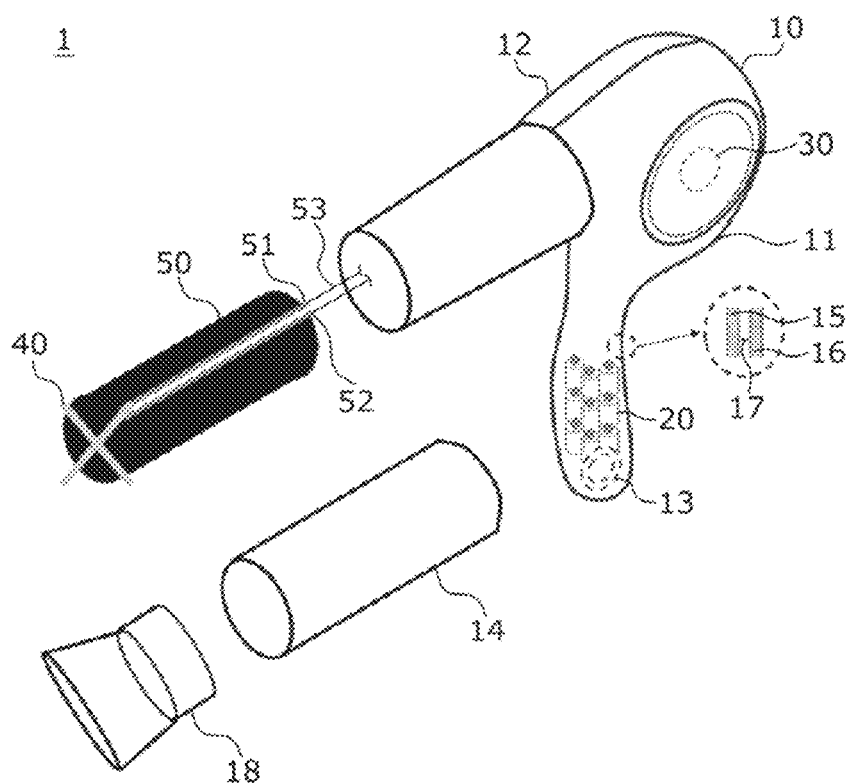
FIG. 1 is an exploded perspective view of a cordless hair dryer according to an embodiment of the present invention.

Hereinafter, exemplary embodiments of the present invention will be described in detail with reference to the accompanying drawings.

However, it should be understood that the technical spirit of the present invention is not limited to embodiments to be disclosed below but may be implemented in many different forms. It should be understood that within the scope of the present invention, one or more elements of each of the embodiments may be selectively combined and substituted.

In addition, the terms (including technical and scientific terms) used in the embodiments of the present invention have the same meaning as commonly understood by one of ordinary skill in the art to which the present invention belongs. It should be further understood that terms, such as those defined in commonly used dictionaries, should be interpreted as having a meaning that is consistent with their meaning in the context of the related art.

Further, the terms used in the embodiments of the present invention are provided only to describe the embodiments of the present invention and not for purposes of limitation.

In this specification, the singular forms include the plural forms unless the context clearly indicates otherwise, and the phrase "at least one element (or one or more elements) of an element A, an element B, and an element C," should be understood as including the meaning of at least one of all combinations being obtained by combining the element A, the element B, and the element C.

Further, in describing components of the present invention, terminologies such as first, second, A, B, (a), and (b) may be used.

Such terms are used to distinguish an element from another element but a nature, an order, or a sequence of the elements is not limited by the terminology.

It will be understood that when an element is referred to as being "connected" or "coupled" to another element, it can be directly connected or coupled to another element, intervening elements may be present, or it can be connected or coupled to another element through the other element.

Further, when an element is referred to as being formed "on" or "under" another element, the description includes the meaning of the two elements being in direct contact with each or the element could be indirectly on or under another element with one or more elements interposed therebetween. Further, when an element is referred to as being formed "on" or "under" another element, the description may include the meaning of "formed in an upper direction of the element" and "formed in a lower direction of the element."

Hereinafter, the embodiments will be described in detail with reference to the accompanying drawings, the same or corresponding components are denoted by the same reference numerals regardless of reference numbers, and thus the description thereof will not be repeated.

FIG. 1 is an exploded perspective view of a cordless hair dryer according to an embodiment of the present invention. Referring to FIG. 1, a cordless hair dryer 1 according to the embodiment of the present invention may include a housing 10, a battery 20, a blower fan 30, a support 40, and a planar heating element 50.

The housing 10 may include a body part 11 and a head part 12. The housing 10 may be formed of a plastic material.

An accommodating space may be provided inside the body part 11 so that the battery 20 may be disposed in the accommodating space. The body part 11 may have an external appearance formed in a shape so as to be gripped and surrounded with a palm of a person. The body part 11 may include an inlet 13 which communicates with the outside to provide an air flow path. In a lower end part of the body part 11, the inlet 13 through which the inside communicates with the outside is provided so that the air may be introduced or discharged. The air introduced into the housing 10 through the inlet 13 may be moved to a blower tube 14 of the head part 12 by an operation of the blower fan 30.

For example, the inlet 13 may be provided in a side surface of the lower end part of the body part 11 or may be provided in a bottom surface of the body part 11. In the case of a corded hair dryer, electric wires are essentially disposed at the lower end part of the body part 11. However, the cordless hair dryer 1 according to the embodiment may receive power through the battery 20 mounted therein, and thus the inlet 13 may be provided in the lower end part of the body part 11.

The body part 11 may include an inner layer 15, which surrounds the battery 20, and an outer layer 16 which is spaced a predetermined interval from the inner layer 15 and surrounds the inner layer 15. An air layer 17 having a predetermined space may be formed between the inner layer 15 and the outer layer 16 of the body part 11 to reduce heat generated from the battery 20 from being moved to the outside of the body part 11. The air introduced through side and lower surfaces of the body part 11 may be moved to the head part 12 by the operation of the blower fan 30.

That is, the battery 20 may be provided inside the body part 11 gripped by the user and thus the cordless hair dryer 1 according to the embodiment may be operated cordlessly in a state of being charged. Further, by providing the air layer having the predetermined space between the inner layer 15 which surrounds the battery 20 and the outer layer 16, it is possible to reduce the heat transmitted from the part gripped by the user when the battery 20 generates heat.7

The head part 12 may have a cylindrical shape, and an accommodating space may be provided inside the head part 12 so that the blower tube 14 may be disposed in the accommodating space. The air inside the housing 10 may be moved through the blower tube 14 and discharged to the outside through an outlet 18 provided at an end of the head part 12 by the operation of the blower fan 30. The battery 20 may be disposed inside the body part 11. The battery 20 may be provided with a plurality of batteries 20 disposed in series or in parallel. The battery 20 may be electrically connected to the blower fan 30 and the planar heating element 50 to supply power to each of the blower fan 30 and the planar heating element 50.

The type and number of batteries 20 may be variously changed according to the resistance and characteristics of the planar heating element 50. For example, a lithium ion battery may be used as the battery 20. However, alternatively, various secondary batteries may be used as the batteries according to a heating characteristic of the planar heating element 20.

When the battery 20 is set without consideration of the resistance of the heating element, the battery 20 may not obtain the amount of heat required. When the resistance of the heating element is too low, an excessive current flows in the heating element so as to limit the amount of current that can be drawn out from the battery 20, and thus it is difficult to implement the cordless hair dryer 1. Even when the cordless hair dryer 1 is implemented in this way, the number of batteries 20 is increased and the weight and volume of the dryer are significantly increased, thereby damaging advantages of the cordless hair dryer 1. When the resistance of the heating element is high, an applied voltage is increased and the number of batteries required is increased, resulting in an increase in the weight and volume of the dryer. Further, in the case in which a booster circuit is used, side effects such as energy loss and heat generation are experienced, and thus the resistance of the heating element is closely related to the performance of the battery 20 to be used. In the present invention, the cordless hair dryer 1 is configured using the planar heating element 30 formed as only a carbon nanotube sheet, and thus there is a technical effect that only the power output from the battery 20 may secure the amount of heat required in the hair dryer. That is, in the case of a conventional cordless hair dryer, a temperature of the heating element rises to 210° C. at 600 W of power, but such conditions are not suitable for the hair dryer. On the other hand, in the cordless hair dryer 1 according to the embodiment of the present invention, a temperature of the planar heating element may rise to 800° C. when about 70 W of power is supplied, and thus there is a technical effect that it is possible to sufficiently secure the amount of heat required in the hair dryer with only a commercial battery.

The blower fan 30 may be disposed in one end of the head part 12. The blower fan 30 may be disposed in one end of the head part 12 adjacent to the body part 11. The blower fan 30 may be operated by receiving power through the battery 20. The blower fan 30 may be rotated by receiving the power and may move the air inside the housing 10 through the blower tube 14.

The support 40 may be inserted into the other end of the head part 12 and fixed to an inner side of the blower tube 14. The support 40 may be disposed in a longitudinal direction of the blower tube 14. For example, the support 40 may be made of a material such as imide or glass having heat resistance.

The support 40 may include a body part 41, around which the planar heating element 50 is wound, and support parts 42 which are in contact with the inner side of the blower tube 14 and support the body part. The body part 41 is a part around which the planar heating element 50 is wound and may have an X shape so that a contact surface of the planar heating element 50 and the air is maximized. The body part 41 extends in the longitudinal direction of the blower tube 14. The body part 41 may be formed to have a length smaller than or equal to a length of the blower tube 14. The body part 41 and the inner side of the blower tube 14 are spaced a predetermined interval from each other. Therefore, the air may be moved along upper and lower surfaces of the planar heating element 50 wound around the body part 41.

The support parts 42 may be formed at both ends of the body part 41. The support parts 42 may be formed in the form in which two pillars are formed in an X shape. Each of the pillars constituting the support parts 42 may be in direct contact with a bore of the blower tube 14 so that the support 40 may be fixed inside the housing 10.

The planar heating element 50 may be formed as a carbon nanotube sheet and may be disposed on the support 40 to receive power from the battery 20 and generate heat. The planar heating element 50 may surround a periphery of the body part 41, and an upper end part and a lower end part of the planar heating element 50 which are opposite to each other on the body part 41 may be spaced a predetermined interval from each other so that a cathode electrode and an anode electrode may be provided along edges of the upper end part and the lower end part.

The planar heating element 50 may include carbon nanotubes in the form of a sheet.

The planar heating element 50 according to the embodiment of the present invention is a carbon nanotube aggregate and is made of only carbon nanotubes without a binder and has very high electrical conductivity, emissivity, and heat resistance.

In the planar heating element 50 according to the embodiment of the present invention, direct radiation, forest spinning using carbon nanotubes grown vertically on a silicon substrate, or a method of manufacturing a sheet by filtering and pressing carbon nanotube powder after dispersing the carbon nanotube powder may be used, or a graphene sheet or the like may be used.

In order to synthesize a carbon nanotube sheet, in an example, a synthetic solution containing an organic solvent such as acetone and butanol, 0.4 to 2.0 wt % of ferrocene, and 1.4 to 9.0 wt % of thiophene were used. The synthetic solution was injected from an upper end part of a high-temperature vertical synthesis furnace in a range of 10 to 100 ml/h, and a transfer gas ($H_2$) was injected together with the synthetic solution at a rate of 800 to 2,000 sccm. A temperature of the synthesis furnace was maintained in a range of 1,000 to 1,500° C., and the synthesized carbon nanotube sheet was wound in a range of 1 to 30 m/min at a lower end part of the synthesis furnace.

Electrodes 51 and 52 may be formed on the generated planar heating element 50.

The planar heating element 56 may have an electrical conductivity of $10^4$ S/m or higher, and the temperature thereof may be increased to about 800° C. when about 70 W of power is supplied.

Figure 2:
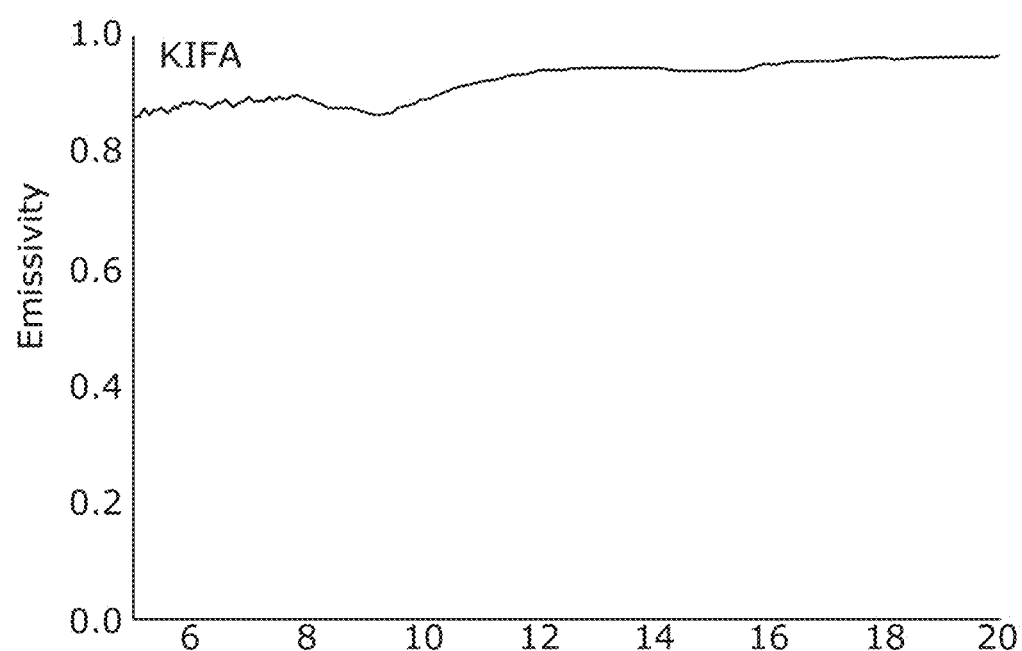
FIG. 2 is a graph for describing a radiation characteristic of a planar heating element according to an embodiment of the present invention.

Further, the planar heating element 50 may emit light having near-infrared ray wavelengths, mid-infrared ray wavelengths, and far-infrared ray wavelengths. FIG. 2 is a graph for describing a radiation characteristic of the planar heating element according to the embodiment of the present invention. In the embodiment of the present invention, the planar heating element may have a very high emissivity. The planar heating element may emit light having various wavelengths, such as near-infrared ray wavelengths, mid-infrared ray wavelengths, and far-infrared ray wavelengths, without additional additives as illustrated in FIG. 2.

Conductive wires 53 for receiving power from the outside may be connected to the electrodes 51 and 52 of the planar heating element 50. The planar heating element 50 generates a heat by receiving the power through the conductive wires 53. In this case, the conductive wires 53 may be connected to the battery 20 disposed in the housing 10 to supply the power to the planar heating element 50.

Figure 3:
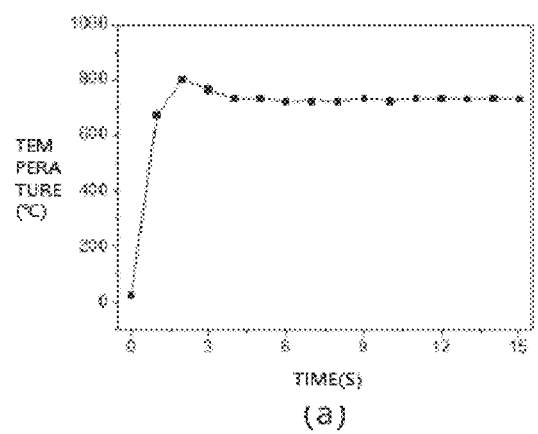
FIG. 3 shows views for describing a heating characteristic of a planar heating element according to an embodiment of the present invention.
Figure 3:
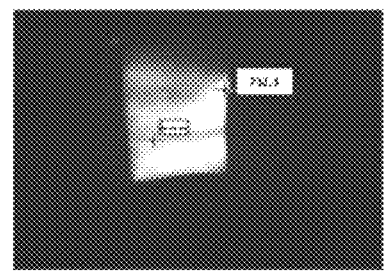

The planar heating element 50 according to the embodiment of the present invention has low specific heat and may be rapidly heated. FIG. 3 shows views for describing the heating characteristic of the planar heating element according to the embodiment of the present invention. Referring to FIG. 3, it can be seen that when 70 W of power is supplied, the temperature of the planar heating element rises to 800° C. instantaneously within 3 seconds as soon as the power is supplied. That is, the temperature of the planar heating element according to the embodiment may rise to a range of 400° C. to 800° C. when the power is supplied, and the temperature may rise to 500° C. or higher within 3 seconds and then the temperature between 500° C. to 800° C. may be continuously maintained. Unlike the general carbon nanotubes, the planar heating element according to the embodiment may generate heat at a temperature of 500° C. or higher which is required for use of the cordless hair dryer. The planar heating element according to the embodiment is an aggregate of carbon nanotubes and is formed of only carbon nanotubes without a binder and other inevitable impurities so that high-temperature heat required for use of the cordless hair dryer may be generated in a short time.

The planar heating element 50 according to the embodiment of the present invention may provide performance optimized to the cordless hair dryer 1 through such an electrical conductivity characteristic, radiation characteristic, and heating characteristic.

Figure 4:
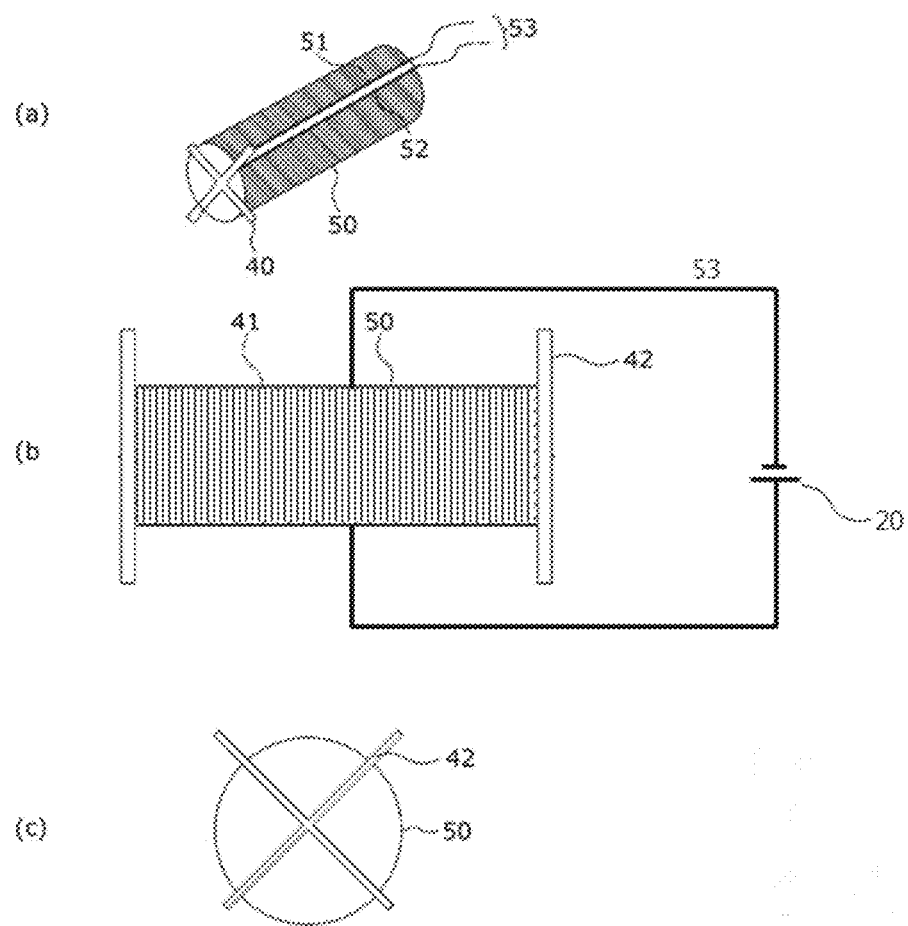
FIGS. 4, 5, 6, 7, 8 and 9 are conceptual views of planar heating elements and supports according to embodiments of the present invention.

The planar heating element 50 may be formed as a carbon nanotube sheet in the form of a sheet having continuity. FIG. 4 illustrates conceptual views of a planar heating element and a support according to an embodiment of the present invention. Referring to FIG. 4, a planar heating element 50 may include a single carbon nanotube sheet which surrounds a body part 41 of a support 40. An upper end part and a lower end part of the carbon nanotube sheet are spaced a predetermined interval from each other and surround the body part 41 of the support 40. A cathode electrode 51 and an anode electrode 52 may be provided along edges of the upper end part and the lower end part of the carbon nanotube sheet so that conductive wires 53 may be connected to the cathode electrode 51 and an anode electrode 52. However, alternatively, electrodes may be provided along edges of side end parts of the carbon nanotube sheet so that the conductive wires may be connected to the electrodes. The arrangement and type of the electrodes may be variously changed according to the type of the carbon nanotube sheet, the position of the battery, and the like.

An upper surface of the planar heating element 50 may be spaced a predetermined interval from a blower tube 14, and a lower surface of the planar heating element 50 may be unfolded by the body part 41 and thus may have a shape wound around a roll. Air which receives external pressure from a blower fan 30 may be moved along the upper surface and the lower surface of the planar heating element 50, and heat generated from the planar heating element 50 may be discharged to the outside of a housing 10.

Figure 5:
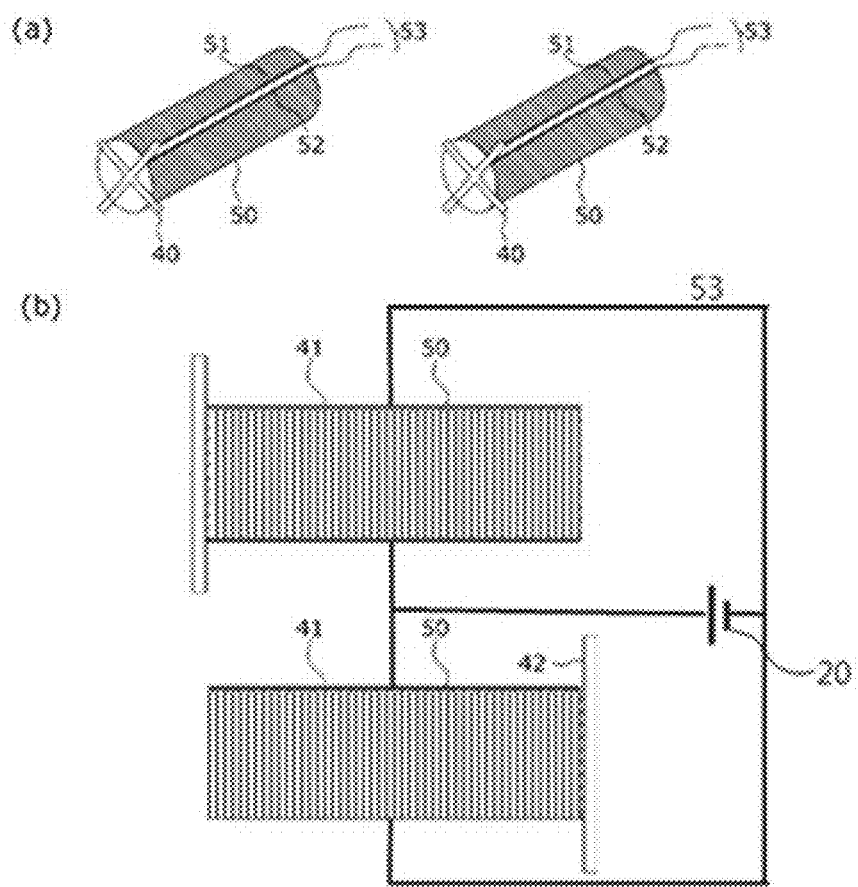

Alternatively, on the support 40 inside the housing 10, a plurality of carbon nanotube sheets 54 on which a plurality of planar heating elements 50 are disposed may be provided. FIG. 5 illustrates conceptual views of a planar heating element and a support according to an embodiment of the present invention. Referring to FIG. 5, a plurality of supports 40 having an X shape are provided inside a housing 10. A carbon nanotube sheet 54 is wound around a body part 41 of each of supports 40. An upper end part and a lower end part of each carbon nanotube sheet are spaced a predetermined interval from each other and surround the body part 41 of the support 40. A cathode electrode 51 and an anode electrode 52 may be provided along edges of the upper end part and the lower end part of each carbon nanotube sheet, and conductive wires 53 may be connected to the cathode electrode 51 and the anode electrode 52. In this case, the carbon nanotube sheets 54 may be connected in parallel to a battery 20 and thus may efficiently receive power.

Figure 6:
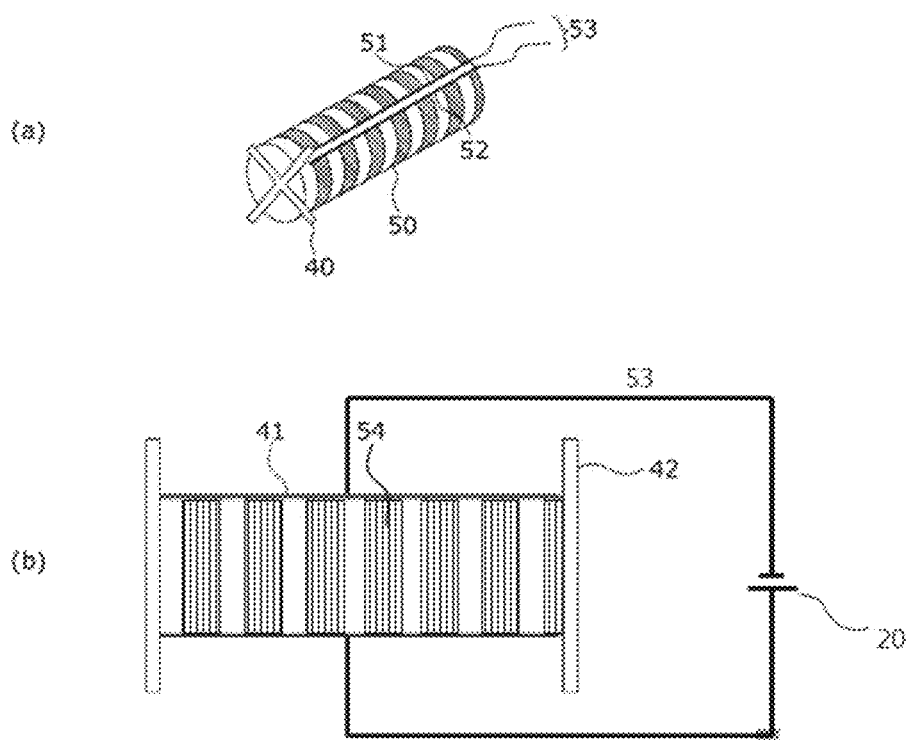

Alternatively, the planar heating element 50 may be provided with a plurality of carbon nanotube sheets 54 disposed on the supports 40 to be spaced a predetermined interval from each other. FIG. 6 illustrates conceptual views of a planar heating element and a support according to an embodiment of the present invention. Referring to FIG. 6, a planar heating element 50 may be provided with a plurality of carbon nanotube sheets 54 having a predetermined width. The carbon nanotube sheets 54 may be disposed on a body part 41 of a support 40 to be spaced a predetermined interval from each other. An upper end part and a lower end part of the carbon nanotube sheet 54 are spaced a predetermined interval from each other and surround the body part 41 of the support 40. A cathode electrode 51 and an anode electrode 52 may be provided along edges of the upper end part and the lower end part of each carbon nanotube sheet, and conductive wires 53 may be connected to the electrodes 51 and 52. The conductive wires 53 may be disposed in a longitudinal direction of the body part 41 and connected to the electrodes 51 and 52 formed on each carbon nanotube sheet 54. Air which receives external pressure from a blower fan 30 may be moved along the upper surface and the lower surface of the planar heating element 50 and along a gap between the carbon nanotube sheets 54, and a contact surface of the planar heating element 50 and the air may be increased. Therefore, the heat generated from the planar heating element 50 may be more efficiently discharged to the outside of the housing 10.

Figure 7:
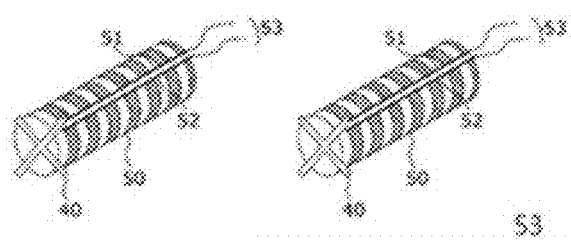
Figure 7:
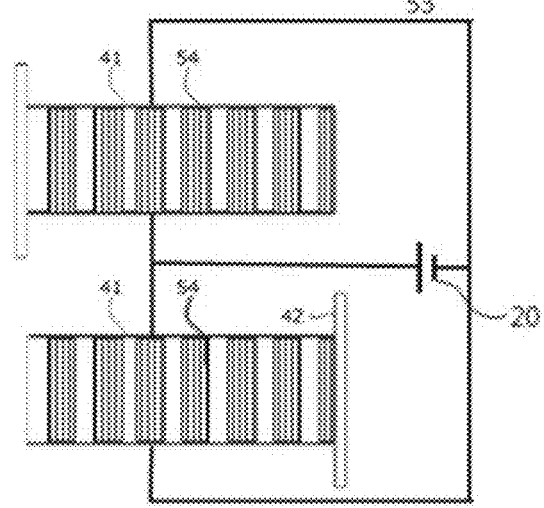

Alternatively, the planar heating element 50 may include a plurality of carbon nanotube sheets 54 which are disposed on a plurality of supports 40 to be spaced a predetermined interval from each other. FIG. 7 illustrates conceptual views of a planar heating element and a support according to an embodiment of the present invention. Referring to FIG. 7, a plurality of supports 40 having an X shape are provided inside a housing 10. The planar heating element 50 may be provided with a plurality of carbon nanotube sheets 54 having a predetermined width. The carbon nanotube sheets 54 may be disposed on the body part 41 of each support to be spaced a predetermined interval from each other. An upper end part and a lower end part of each carbon nanotube sheet 54 are spaced a predetermined interval from each other and surround the body part 41 of the support 40. A cathode electrode 51 and an anode electrode 52 may be provided along edges of the upper end part and the lower end part of each carbon nanotube sheet, and conductive wires 53 may be connected to the electrodes 51 and 52. The conductive wires 53 may be disposed in a longitudinal direction of the body part 41 and connected to the electrodes 51 and 52 formed on each carbon nanotube sheet 54. In this case, the carbon nanotube sheets 54 may be connected in parallel to the battery 20 and thus may efficiently receive power. Further, air which receives external pressure from a blower fan 30 may be moved along the upper surface of and the lower surface of the planar heating element 50 and along a gap between the carbon nanotube sheets 54, and a contact surface of the planar heating element 50 and the air may be increased. Therefore, the heat generated from the planar heating element 50 may be more efficiently discharged to the outside of the housing 10.

Figure 8:
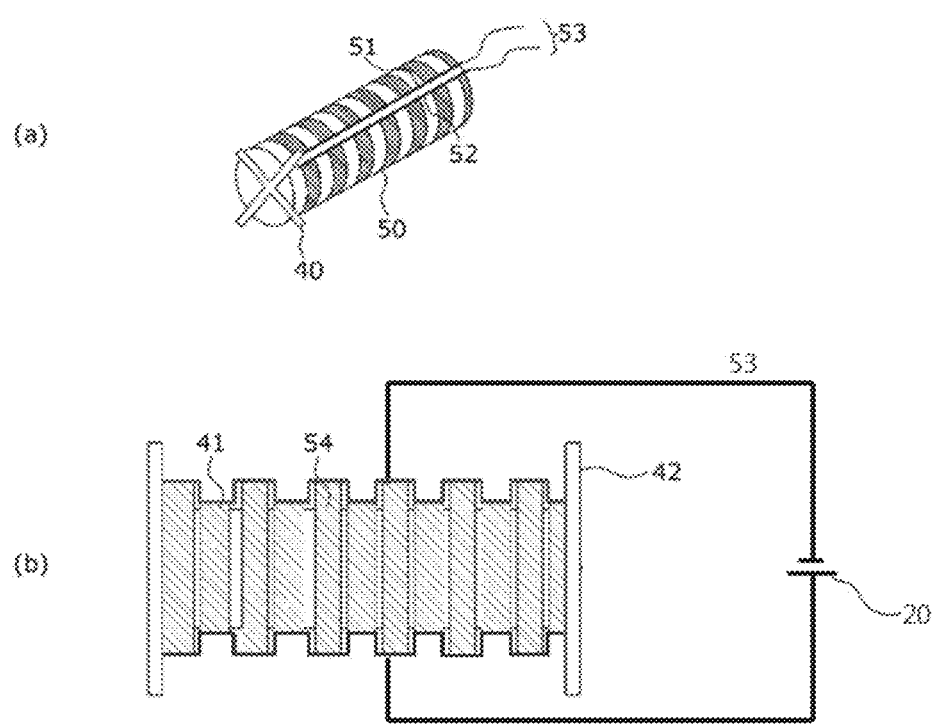

Alternatively, the planar heating element 50 may be provided with a plurality of carbon nanotube sheets 54 which are disposed on a support 40 to be spaced a predetermined interval from each other, on which a pattern is provided on a surface of a body part 41. FIG. 8 illustrates conceptual views of a planar heating element and a support according to an embodiment of the present invention. Referring to FIG. 8, the planar heating element 50 may be provided with a plurality of carbon nanotube sheets 54 having a predetermined width. A pattern having an uneven shape may be formed on a surface of the body part 41 of the support. The carbon nanotube sheets 54 may be disposed on the body part 41 of the support to be spaced a predetermined interval from each other. In this case, a width of the carbon nanotube sheet 54 may be smaller than or equal to a width of the uneven shape formed on the body part 41. Therefore, the carbon nanotube sheets 54 may be disposed on the body part 41 according to the pattern having an uneven shape. An upper end part and a lower end part of each carbon nanotube sheet 54 are spaced a predetermined interval from each other and surround the body part 41 of the support 40. A cathode electrode 51 and an anode electrode 52 may be provided along edges of the upper end part and the lower end part of each carbon nanotube sheet, and conductive wires 53 may be connected to the electrodes 51 and 52. The conductive wires 53 may be disposed in a longitudinal direction of the body part 41 and connected to the electrodes 51 and 52 formed on each carbon nanotube sheet 54. Air which receives external pressure from a blower fan 30 may be moved along the upper surface and the lower surface of the planar heating element 50 and along a gap between the carbon nanotube sheets 54, and a contact surface of the planar heating element 50 and the air may be increased. Therefore, the heat generated from the planar heating element 50 may be more efficiently discharged to the outside of the housing 10.

Figure 9:
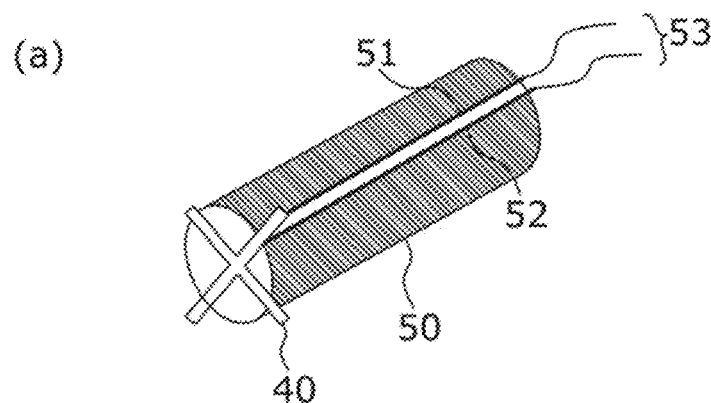
Figure 9:
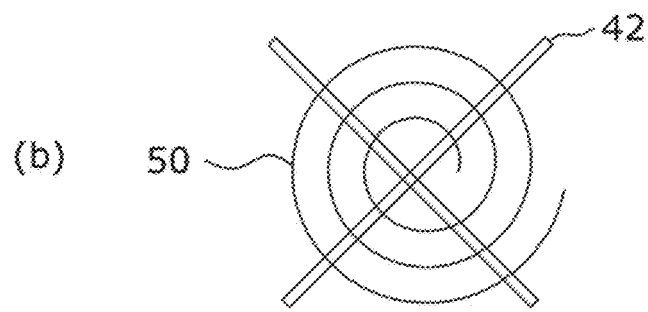

Alternatively, the planar heating element 50 may be disposed on the support 40 in a spiral form. FIG. 9 illustrates conceptual views of a planar heating element and a support according to an embodiment of the present invention. Referring to FIG. 9, the planar heating element 50 may include a single carbon nanotube sheet 54 which surrounds a body part 41 of a support in a spiral form. In a body part 41 of the support, slits are formed to be spaced a predetermined interval from each other so that the carbon nanotube sheet 54 passes through the slits. A cathode electrode 51 and an anode electrode 52 may be provided along edges of the upper end part and the lower end part of the carbon nanotube sheet, and conductive wires 53 may be connected to the electrodes 51 and 52. However, alternatively, electrodes may be provided on edges of side end parts of the carbon nanotube sheet so that the conductive wires may be connected to the electrodes. The arrangement and type of the electrodes may be variously changed according to the type of the carbon nanotube sheet, the position of the battery, and the like.

By arranging the planar heating elements 50 on the body part 41 of the support in a spiral form, a contact area of the planar heating element 50 and the air may be significantly increased, and the heat generated from the planar heating element 50 may be more efficiently discharged to the outside of the housing 10.

Figure 10:
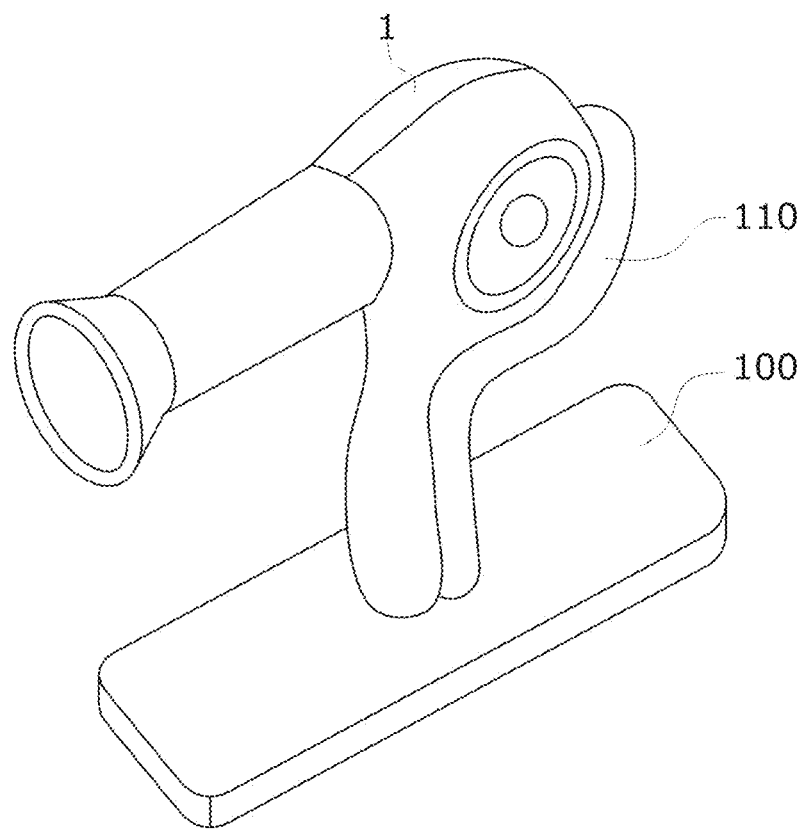
FIG. 10 is a conceptual view of a cordless hair dryer according to an embodiment of the present invention.

FIG. 10 is a conceptual view of a cordless hair dryer according to an embodiment of the present invention. Referring to FIG. 10, a cordless hair dryer 1 may be detachably mounted on a mount 100. The mount 100 may receive power by wire. The cordless hair dryer 1 may be automatically charged while being mounted on the mount 100. Further, the cordless hair dryer 1 may be operated even in a mounted state. The mount 100 may include an angle adjuster 110, and the angle adjuster 110 may adjust a blowing angle in a state in which the cordless hair dryer 1 is mounted.

Table 1 shows operation results of the cordless hair dryer 1 according to the embodiment of the present invention. According to Table 1, when 230 W of power was supplied, the temperature of air discharged from the cordless hair dryer 1 was measured in a range of 55° C. to 57° C., and when 270 W of power was supplied, the temperature of air discharged from the cordless hair dryer 1 was measured in a range of 60° C. to 61° C. A lithium ion battery was used as the battery 20, and a strength of wind was measured based on a strength of wind of a commercial corded hair dryer. When the power was 230 W, the temperature of the air was lowered due to influence of the strength of the wind. According to the experimental results, it can be seen that the temperature of the air discharged from the cordless hair dryer 1 was measured close to 57° C. which is a drying temperature suitable for hair.

TABLE 1

| | Wind Strength | | |
|---|---|---|---|
| Power | Medium | Strong | Others |
| 230 W | 57 | 55 | Wind affected |
| 270 W | 60 | 61 | No wind influence |

Unlike the corded hair dryer, the cordless hair dryer receives the power from the battery and thus there are restrictions on an amount of energy that can be used. Therefore, when the energy consumption of the heating element is large, a large amount of energy should be supplied, which causes an increase in weight and volume of the cordless hair dryer. Heavy and large cordless hair dryers do not have great advantages compared to the corded hair dryers. On the other hand, when the number of batteries mounted in the cordless hair dryer is small, an amount of energy that can be supplied is reduced and the temperature of the air may not be increased sufficiently. The cordless hair dryer according to the embodiment of the present invention has an advantage in that the air having a temperature similar to 57° C., which is a drying temperature suitable for hair, may be discharged using a commercial lithium ion battery. Further, there is a technical effect that the cordless hair dryer may be designed to discharge air in various temperature ranges with a desired amount of power by variously changing the resistance characteristics of the planar heating element 50 and the characteristics of the battery 20.

Terms described in the specification such as "part" refer to software or hardware components such as a field-programmable gate array (FPGA) or an Application-Specific Integrated Circuit (ASIC), and the part performs certain functions. However, the "part" is not limited to software or hardware. The "part" may be configured in a storage medium that may be addressed or may be configured to be executed by at least one processor. Therefore, examples of the "part" include components such as software components, object-oriented software components, class components and task components, and processes, functions, attributes, procedures, subroutines, segments of program codes, drivers, firmware, micro codes, circuits, data, database, data structures, tables, arrays and variables. Components and functions provided from "parts" may be combined into a smaller number of components and "parts" or may be further separated into additional components and "parts." In addition, the components and the "units" may be implemented to playback one or more central processing units (CPUs) in a device or a secure multimedia card.

While the present invention has been described with reference to the exemplary embodiments, it will be understood by those skilled in the art that various changes and modifications may be made without departing from the spirit and scope of the present invention as defined by the appended claims.

REFERENCE NUMERALS

1: CORDLESS HAIR DRYER
10: HOUSING
20: BATTERY
30: BLOWER FAN
40: SUPPORT
50: PLANAR HEATING ELEMENT

The invention claimed is:

1. A cordless hair dryer comprising:
a housing including a body part gripped by a user and a head part having a blower tube therein;
a battery disposed inside the body part;
a blower fan disposed in one end of the head part;
a support adapted to be inserted into the other end of the head part which is in an opposite side of one end of the head part and fixed to an inner side of the blower tube; and
a planar heating element which is formed as a carbon nanotube sheet and disposed on the support to receive power from the battery,
wherein the planar heating element surrounds a periphery of the body part,
wherein an upper end part and a lower end part of the planar heating element which are opposite to each other on the body part are spaced a predetermined interval from each other, and a cathode electrode and an anode electrode are provided along edges of the upper end part and the lower end part so that the power is supplied through the cathode electrode and the anode electrode, and
wherein the planar heating element is an aggregate of carbon nanotubes and is formed of only carbon nanotubes without a binder and other inevitable impurities so that a temperature of the planar heating element rises to a range of 400° C. to 800° C. when the power is supplied.

2. The cordless hair dryer of claim 1, wherein the planar heating element is formed as a carbon nanotube sheet in the form of a sheet having continuity.

3. The cordless hair dryer of claim 1, wherein:
the support is provided with a plurality of supports; and
the planar heating element includes a plurality of carbon nanotube sheets, each of which is disposed on one of the supports.

4. The cordless hair dryer of claim 1, wherein the planar heating element includes a plurality of carbon nanotube sheets disposed on the support to be spaced a predetermined interval from each other.

5. The cordless hair dryer of claim 1, wherein the planar heating element is disposed on the support in a spiral form.

6. The cordless hair dryer of claim 1, wherein the planar heating element has an electrical conductivity of $10^4$ S/m or higher.

7. The cordless hair dryer of claim 1, wherein the body part includes an inlet which communicates with an outside of the body part and provides an air flow path.

8. The cordless hair dryer of claim 1, wherein the body part includes an inner layer, which surrounds the battery, and an outer layer which is spaced a predetermined interval from the inner layer and surrounds the inner layer.

9. The cordless hair dryer of claim 1, wherein the support includes:
a body part around which the planar heating element is wound; and
a support part which is in contact with the inner side of the blower tube and supports the body part.

10. The cordless hair dryer of claim 1, wherein the planar heating element emits anions and light having near-infrared ray wavelengths, mid-infrared ray wavelengths, and far-infrared ray wavelengths.

11. The cordless hair dryer of claim 1, wherein the planar heating element has a temperature of 800° C. when 70 W of power is supplied.

12. The cordless hair dryer of claim 2, wherein the planar heating element includes a plurality of carbon nanotube sheets disposed on the support to be spaced a predetermined interval from each other.

13. The cordless hair dryer of claim 3, wherein the planar heating element includes a plurality of carbon nanotube sheets disposed on the support to be spaced a predetermined interval from each other.

14. The cordless hair dryer of claim 2, wherein the planar heating element is disposed on the support in a spiral form.

15. The cordless hair dryer of claim 3, wherein the planar heating element is disposed on the support in a spiral form.

* * * * *